United States Patent

Hamberg

[11] Patent Number: 5,947,653
[45] Date of Patent: Sep. 7, 1999

[54] HELIX DRILL HAVING COOLANT CHANNELS AND HELICAL CHIP FLUTES

[75] Inventor: Jens Hamberg, Norrköping, Sweden

[73] Assignee: Seco Tools AB, Fagersta, Sweden

[21] Appl. No.: 09/066,717

[22] Filed: Apr. 27, 1998

[30] Foreign Application Priority Data

Apr. 30, 1997 [SE] Sweden ................................ 9701627

[51] Int. Cl.$^6$ .................................................. B23B 51/02
[52] U.S. Cl. .............................. 408/59; 408/224; 408/230
[58] Field of Search ............................. 408/59, 57, 224, 408/223, 230, 229, 227

[56] References Cited

U.S. PATENT DOCUMENTS 5,478,176 12/1995 Stedt et al. .................................. 408/59
5,509,761 4/1996 Grossman et al. .
5,676,499 10/1997 Tukala ........................................ 408/59
5,800,101 9/1998 Jindai et al. ............................. 408/227

Primary Examiner—Daniel W. Howell
Assistant Examiner—Monica Smith
Attorney, Agent, or Firm—Burns, Doane, Swecker & Mathis, L.L.P.

[57] ABSTRACT

A helix drill for metal chip removing machining includes a shank which defines a longitudinal rotary axis and has front and rear ends. The front end carries two cutting edges. Two chip flutes are formed in an outer periphery of the shank and extend helically rearwardly from respective cutting edges for conducting chips. Two coolant channels extend within the shank for conducting cooling fluid. A major part of the length of each cooling channel is straight and oriented parallel to the axis. A total helical twist of each of the chip flutes along the length of the shank is about 30°.

12 Claims, 2 Drawing Sheets

HELIX DRILL HAVING COOLANT CHANNELS AND HELICAL CHIP FLUTES

BACKGROUND OF THE INVENTION

The present invention relates to a drill, preferably for chip removing machining, including a shank with a tip forming front end, with at least two cutting edges, and a rear end, two chip flutes extending from the front end to the rear end of the shank, and two cooling channels extending through the shank of the drill and terminating at the front end.

PRIOR ART

Drills of the above-described type are used for chip removing machining and especially for drilling holes in metallic work pieces. During the machining, chips are produced at the tip forming front end of the drill shank, whereby the chips are formed and transported from the tip forming end of the shank to the rear end of the drill shank. This transport is being performed via the chip flutes.

To be able to increase the depth of the chip flute of the central insert a design of a drill has been provided where a central cooling channel extending along a part of the length of the drill shank is replaced by two cooling channels which run along the entire length of the drill shank. In this known helix drill the cooling channels run helically in the drill shank, whereby the cooling channels are located between the helically running chip flutes, i.e. the cooling channels do not interfere with the chip flutes, so the chip flutes can be made deeper.

Through U.S. Pat. No. 5,509,761 a drill is previously known where two straight cooling channels run along the entire axial extension of the shank and of the chip flutes. Both of these straight cooling channels have a certain inclination relative to the center axis of the drill in order to avoid interfering with the helical chip flutes.

OBJECTS AND SUMMARY OF THE INVENTION

One object of the present invention is to provide a drill of the above-described type where a simple production of the drill is combined with an adequate transport of the chips in the chip flutes, the transport being performed by means of a cooling medium, preferably a coolant, which is supplied via the cooling channels and is returned via the chip flutes.

Another object of the present invention is that the design of the cooling channels and the chip flutes shall be such that the strength of the drill is not negatively influenced as compared to known drills.

The object of the present invention are attained by a helix drill for metal chip removing machining comprising a shank which defines a longitudinal rotary axis and includes front and rear ends. The front end carries cutting edges. Two chip flutes are formed in an outer periphery of the shank and extend helically rearwardly from the front end for conducting chips cut by respective cutting edges. Two cooling channels extend within the shank for conducting coolant fluid. A major part of the length of each cooling channel is straight and oriented parallel to the axis.

Preferably, a total helical twist of each of the chip flutes along the length of the shank is about 30°.

Major parts of the cooling channel lengths are preferably spaced radially from the axis by substantially equal distances.

Front end portions of the cooling channels are preferably deflected outwardly from the parallel relationship with the axis.

Each chip flute preferably forms a helix angle with the axis in the range of 2–5°.

The shank preferably includes a web having a diameter of about 22% of a diameter of the shank.

The cutting edges are preferably formed by two cutting inserts, respectively, which are mounted on the shank. The inserts include a central insert and a peripheral insert which are spaced at different distances from the axis.

A wall of the chip flute associated with the central insert preferably has, when viewed in cross-section, a portion of generally circular shape.

The chip flute associated with the peripheral insert preferably includes a bottom and substantially parallel sides as viewed in cross-section.

The chip flute associated with the peripheral insert preferably has a cross-sectional width equal substantially to one half of a diameter of the shank.

BRIEF DESCRIPTION OF THE DRAWINGS

Below an embodiment of the invention is described with reference to the enclosed drawings, where.

DETAILED DESCRIPTION OF A PREFERRED EMBODIMENT OF THE INVENTION

Figure 1:
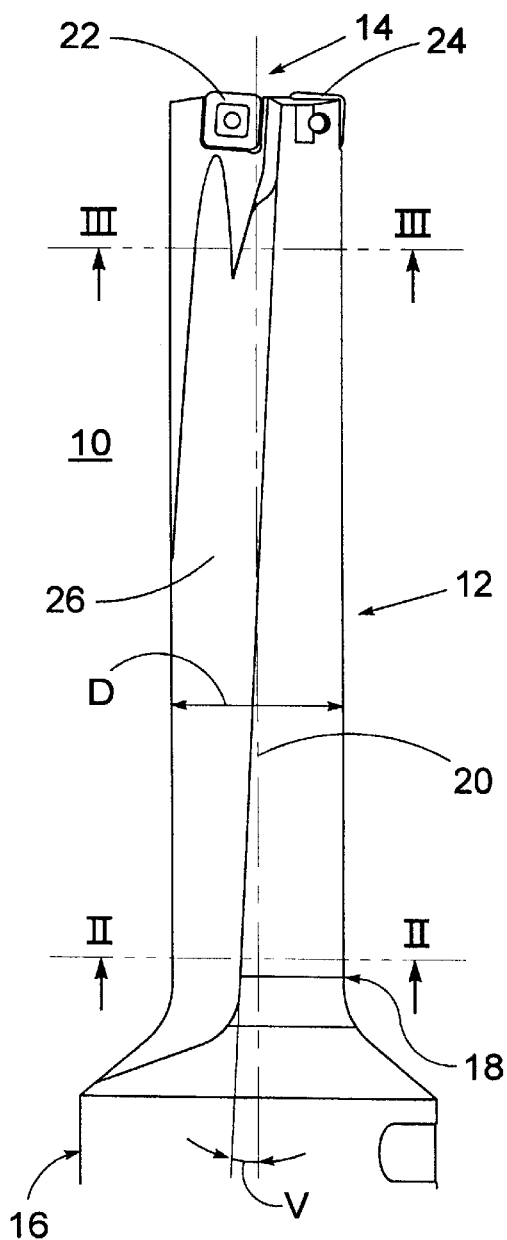
FIG. 1 shows a side view of a drill according to the invention.
Figure 3:
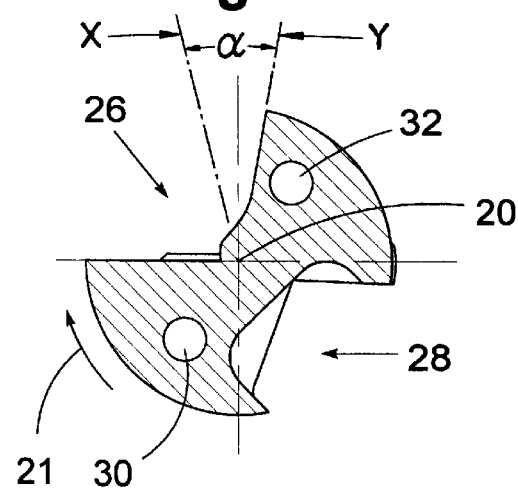
FIG. 3 shows a cross section along line III—III in FIG. 1.
Figure 4:
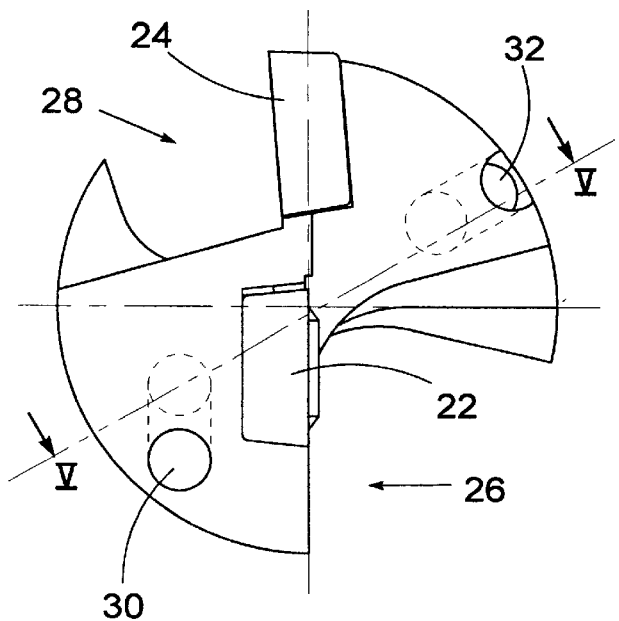
FIG. 4 shows a front end view of the shank of the drill according to the invention.
Figure 5:
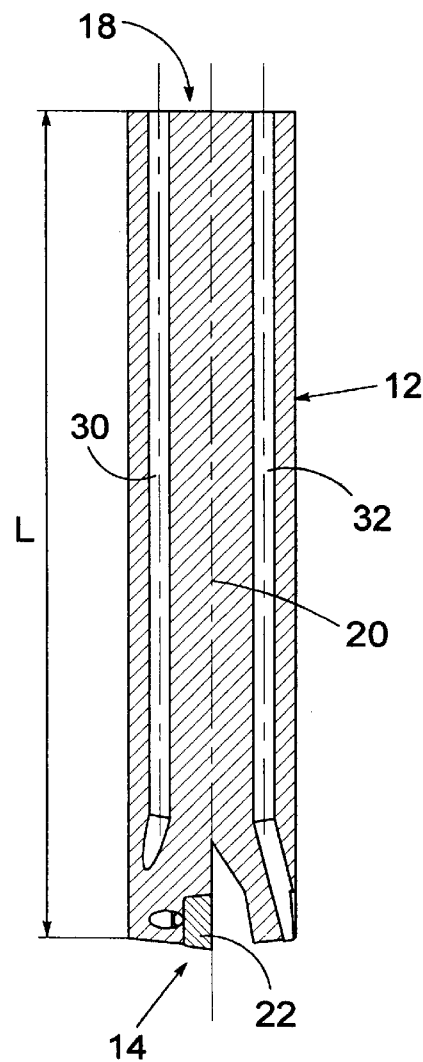
FIG. 5 shows a longitudinal section along line V—V in FIG. 4.

The drill 10 shown in FIG. 1 comprises a shank 12 having a tip forming front end 14, and a rear holder 16 to which a rear end 18 of the shank 12 is connected. The holder 16 is intended to be inserted in an adapter (not shown) of a machine tool. The shank 12 and the holder 16 have a common longitudinal center axis 20, which also constitutes the rotational axis of the drill 10. The rotational direction of the drill 10 has been indicated by the arrow 21 in FIG. 3.

The tip forming front end 14 of the shank 12 is provided with a central cutting insert 22 and a peripheral cutting insert 24 (partly hidden). Preferably the cutting inserts 22, 24 are exchangeable. The shank 12 has a substantially constant diameter D from the tip forming end 14 to the rear end 18.

Two chip flutes 26, 28, only one of which 26 is shown in FIG. 1, extend helically from the tip forming end 14 to the holder 16 where the chip flutes 26, 28 terminate by extending radially outwardly to an outer periphery of the shank. As is shown in FIG. 1, the chip flute 26 has a certain positive helix angle V. A preferred value of the angle V lies within the interval of 2°–5°. The chip flute 28 not shown in FIG. 1 has just as great a helix angle V. In this connection it shall be noted that within the limits of the invention it is possible to provide a negative helix angle with reference to the same rotational direction, see the arrow 21 in FIG. 3. A negative helix angle is advantageous for vibrational dampening of the drill 10.

Each chip flute 26, 28 has a cross-sectional shape which is substantially constant along the entire length L of the shank 12.

The drill 10 according to the invention is preferably intended for drills where the length of the shank L is related to the shank diameter D (see FIG. 1) as follows: 5×D≧L≧3×D. If a suitable helix angle V is chosen within the above-identified interval, a total helical twist of each of the chip flutes 26, 28 of about 30° can be obtained over the entire length of the shank 12.

As is shown in FIGS. 2–6, two cooling channels 30, 32 expand in the shank 12, the cooling channels 30, 32 extending from the rearmost free end of the holder 16 (not shown) and all the way through the shank 12 to the tip forming end 14 into which they open. In the shown example, main portions of the cooling channels 30, 32 run parallel to the central axis 20 in the holder 16 as well as along a major part of the length L of the shank 12, while being spaced by equal distances from the axis. As is most visibly shown in FIG. 4 and 5 of the cooling channels 30, 32 undergo a radially outward deflection before they open into the tip forming end 14. The reason for this deflection is so the cooling channels 30, 32 will terminate in the tip forming end 14 in such a way that they do not interfere with the cutting inserts 22, 24 or the respective fastening means thereof. The cooling channel 32 opens into the peripheral surface of the shank 12. From the cross-sections shown in FIGS. 2 and 3 it is apparent that despite the fact that the chip flutes 26, 28 are helical the cooling channels 30, 32 do not interfere with the chip flutes 26, 28 anywhere along the entire length of the shank 12 (compare FIGS. 2 and 3). The reason for this is that the total helical twist α of each flute along the entire length L of the shank 12 is only about 30°. The helical twist can be seen most clearly by viewing the chip flute 28 in FIGS. 2 and 3, wherein the total helical twist between the X and Y is small. In this connection it shall be noted that it has been surprisingly learned that for drills with a shank length L and diameter D relationship of 5×D≧L≧3×D, a helical twist α over the entire length L of the shank of about 30° will not cause any measurable deterioration of transfer of chips in the chip flutes 26, 28. This discovery has enabled the cooling channels 30, 32 to be formed straight (rectilinearly) and parallel to the central axis 18 along substantially the entire length L of the shank 12. This is an outstanding advantage regarding production of the drill 10.

Figure 2:
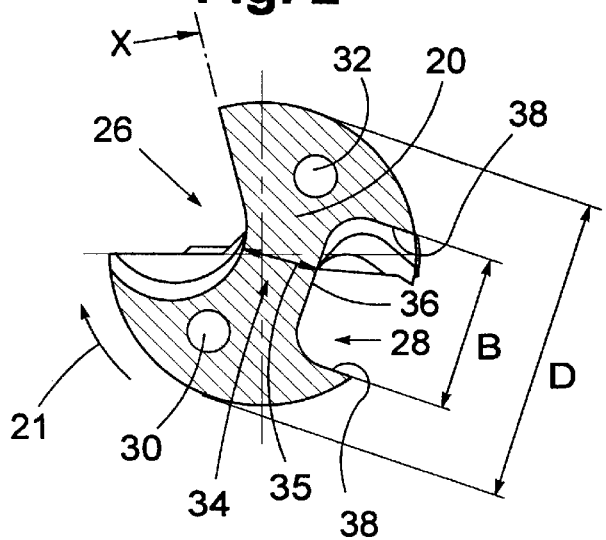
FIG. 2 shows a cross section along line II—II in FIG. 1—1.

By having the cooling channels 30, 32 running at a radial distance from the center axis 20 of the shank 12, the web 34 of the drill 10, see FIG. 2, is intact, which is advantageous for the rigidity of the drill 10. The web diameter 36 is depicted in FIG. 2. Preferably, the web diameter 35 constitutes about 22% of the shank diameter D. From FIGS. 2, 3 and 6 it is apparent that the web 34 of the drill 10 is eccentrically located in relation to the center axis 18 of the drill 10, which results from the fact that the chip flute 26 for the central insert 22 is deeper than the chip flute 28 for the peripheral insert 24.

Figure 6:
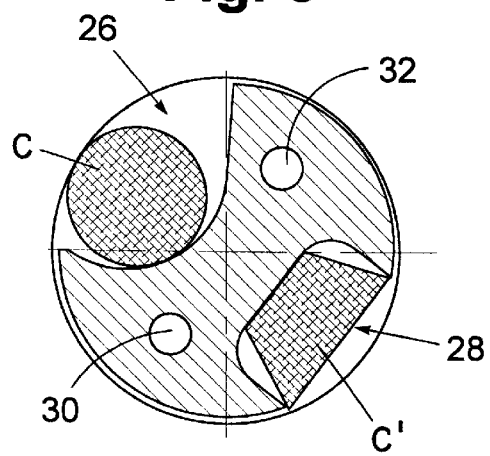
FIG. 6 shows a schematic cross section through a shank of the drill according to the invention, wherein the contours of the cut metal chips and the flute walls are shown.

It is generally known that the chips C from the central insert 22 are circularly shaped while the chips C' from the peripheral insert 24 have a trapezoidal contour, see FIG. 6. The dimensions of the chips substantially depend on the cutting geometry of the tip forming end, and therefor one can empirically calculate maximal dimensions for the respective chips a certain drill generates. This knowledge was used when dimensioning the chip flutes 22, 24.

As is illustrated in FIG. 6 it is important that the chip flute 26 has a depth which can contain the circularly shaped chips cut by the central insert 22. In the chip flute 28 for the peripheral insert 24 the cross sectional area has been adapted to the utmost possible extent to the trapezoidal contour of the chips cut by the peripheral insert 24. As appears most clearly in FIG. 2 the chip flute 28 has a substantially planar bottom 36 and substantially parallel planar side-walls 38. The sidewalls 38 and the bottom 36 are connected with each other via soft rounded transitions. The relationship between the width B of the chip flute 28 and the diameter D of the shank 12 is that B is preferably about one-half the diameter D, i.e. B≈0.5×D.

Through a review of FIG. 6 it can be seen that the cross section of the chip flute 28 has, in a striking manner, been adapted to the trapezoidal shape of the chip. Since the side walls of the chip flute 28 are substantially parallel, only a minimum amount of the drill shank material needs to be removed in the area of the chip flute 28, which is advantageous for maintaining the rigidity of the drill 10.

Although the present invention has been described in connection with a preferred embodiment thereof, it will be appreciated by those skilled in the art that additions, deletions, modifications, and substitutions not specifically described may be made without departing from the spirit and scope of the invention as defined in the appended claims.

What is claimed is:

1. A helix drill for metal chip removing machining, comprising a shank defining a longitudinal rotary axis and including front and rear ends, the front end carrying cutting edges; two chip flutes formed in an outer periphery of the shank and extending helically rearwardly from the front end for conducting chips cut by respective cutting edges; the shank including first and second portions situated between the chip flutes, first and second cooling channels extending within the shank for conducting coolant fluid, a major part of the length of each of the first and second cooling channels being straight and oriented parallel to the axis within respective ones of the first and second portions of the shank.

2. The drill according to claim 1 wherein a total helical twist of each of the chip flutes along the length of the shank is about 30 degrees.

3. The drill according to claim 1 wherein said major parts of the cooling channel lengths are spaced radially from the axis by substantially equal distances.

4. The drill according to claim 1 wherein front end portions of the cooling channels are deflected outwardly from the parallel relationship with the axis.

5. The drill according to claim 4 wherein each of the chip flutes forms a helix angle with the axis in the range of 2°–5°.

6. The drill according to claim 5 wherein the shank includes a web having a diameter of about 22% of a diameter of the shank.

7. The drill according to claim 1 wherein each of the chip flutes forms a helix angle with the axis in the range of 2°–5°.

8. The drill according to claim 1 wherein the shank includes a web having a diameter of about 22% of a diameter of the shank.

9. The drill according to claim 1 wherein the cutting edges are formed by two cutting inserts, respectively, mounted on the shank; the inserts comprising a central insert and a peripheral insert spaced at different distances from the axis.

10. The drill according to claim 9 wherein a wall of the chip flute associated with the central insert has, when viewed in cross section, a portion of generally circular shape.

11. The drill according to claim 9 wherein the chip flute associated with the peripheral insert includes a bottom and substantially parallel sides as viewed in cross section.

12. The drill according to claim 9 wherein the chip flute associated with the peripheral insert has a cross-sectional width equal substantially to one-half of a diameter of the shank.

* * * * *